United States Patent
Jung et al.

(10) Patent No.: US 8,830,879 B2
(45) Date of Patent: Sep. 9, 2014

(54) METHOD FOR PERFORMING HANDOVER IN A MOBILE COMMUNICATION SYSTEM

(75) Inventors: In Uk Jung, Anyang-si (KR); Ki Seon Ryu, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 13/145,548

(22) PCT Filed: Jan. 20, 2010

(86) PCT No.: PCT/KR2010/000359
§ 371 (c)(1),
(2), (4) Date: Jul. 20, 2011

(87) PCT Pub. No.: WO2010/085080
PCT Pub. Date: Jul. 29, 2010

(65) Prior Publication Data
US 2011/0299502 A1  Dec. 8, 2011

Related U.S. Application Data

(60) Provisional application No. 61/145,750, filed on Jan. 20, 2009.

(51) Int. Cl.
*H04B 7/00* (2006.01)
*H04W 4/00* (2009.01)
*H04J 3/16* (2006.01)
*H04W 36/00* (2009.01)

(52) U.S. Cl.
CPC ...... *H04W 36/0077* (2013.01); *H04W 36/0066* (2013.01)
USPC ............ 370/277; 370/331; 370/329; 370/437

(58) Field of Classification Search
CPC . H04W 80/04; H04W 88/08; H04W 72/0453; H04W 76/00
USPC ......................................... 370/331
See application file for complete search history.

(56) References Cited

U.S. PATENT DOCUMENTS

| | | | | |
|---|---|---|---|---|
| 6,188,904 | B1 * | 2/2001 | Marsan ......................... | 455/450 |
| 8,208,429 | B2 * | 6/2012 | Hahn et al. .................... | 370/328 |
| 8,311,030 | B2 * | 11/2012 | Thakare ........................ | 370/350 |
| 2008/0056195 | A1 * | 3/2008 | Lee et al. ...................... | 370/331 |
| 2008/0316968 | A1 * | 12/2008 | Sun et al. ...................... | 370/331 |
| 2009/0016303 | A1 * | 1/2009 | Shaik et al. ................... | 370/331 |
| 2009/0168745 | A1 * | 7/2009 | Ahmadi et al. ............... | 370/350 |
| 2009/0227255 | A1 * | 9/2009 | Thakare ........................ | 455/434 |
| 2010/0069070 | A1 * | 3/2010 | Shi et al. ....................... | 455/436 |

FOREIGN PATENT DOCUMENTS

| | | |
|---|---|---|
| KR | 1020010073909 | 8/2001 |
| KR | 1020050019364 | 3/2005 |
| KR | 10-0735242 | 7/2007 |

* cited by examiner

*Primary Examiner* — Faruk Hamza
*Assistant Examiner* — Abu-Sayeed Haque
(74) *Attorney, Agent, or Firm* — Lee, Hong, Degerman, Kang & Waimey (57) ABSTRACT

Disclosed is a method for enabling a mobile terminal to perform a handover in a mobile communication system. A serving base station which supports both a first communication scheme and a second communication scheme can transmit, to the mobile terminal, a neighbor base station list broadcast message containing time offset information indicating the point of time to transmit information on a second base station which uses the second communication scheme and supports only the second communication scheme via a specific zone using the second communication scheme. The mobile terminal which has received the message can receive, from the serving base station, the information on the second base station via the specific zone on the basis of the received time offset information.

16 Claims, 5 Drawing Sheets

METHOD FOR PERFORMING HANDOVER IN A MOBILE COMMUNICATION SYSTEM

CROSS-REFERENCE TO RELATED APPLICATIONS

This application is a 371 U.S. national stage application of International Application No. PCT/KR2010/000359, filed on Jan. 20, 2010, which claims priority to U.S. Provisional Application Ser. No. 61/145,750, filed on Jan. 20, 2009, the contents of which are incorporated by reference herein in their entirety.

TECHNICAL FIELD

The present invention relates to a wireless communication system, and more particularly, to a method for performing a handover in a mobile station of a wireless communication system.

BACKGROUND ART

In a mobile communication system, as mobile stations move, it is necessary to perform a handover. The handover is performed through several steps. In the following description, a procedure for a mobile station to perform a handover in a conventional legacy system is schematically explained. Generally, a handover procedure mainly consists of three steps including: (1) handover initialization and preparation; (2) handover execution; and (3) handover completion.

Figure 1:
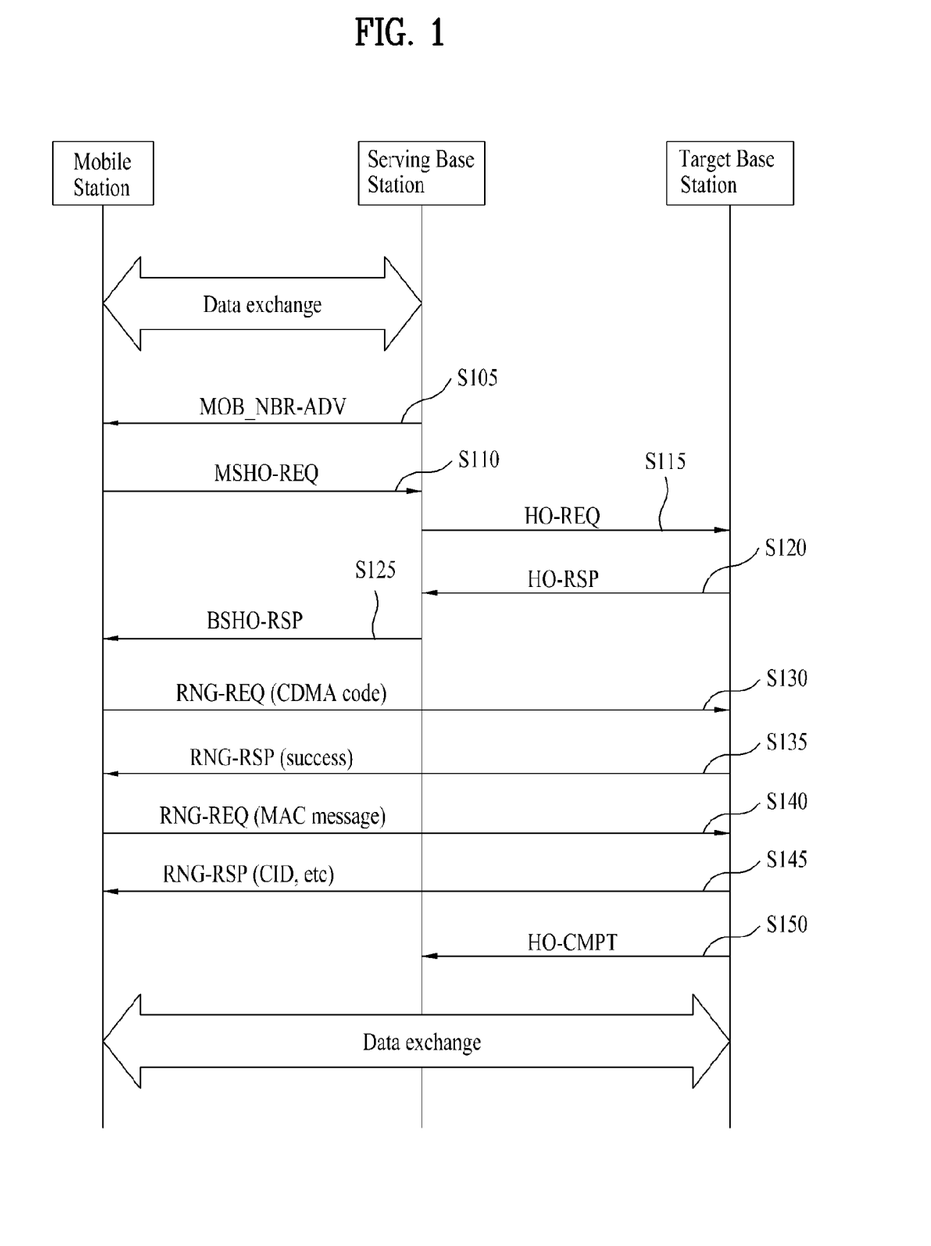
FIG. 1 is a diagram of a handover procedure for performing a most basic ranging in a legacy system.

FIG. 1 is a diagram of a handover procedure for performing a most basic ranging in a legacy system.

Referring to FIG. 1, a base station periodically broadcasts information on a neighbor base station within its coverage to mobile stations via MOB_NBR-ADV message [S105]. The mobile station starts a scan through a handover trigger condition in the course of communicating with a serving base station (SBS). If a hysteresis margin is exceeded, the mobile station sends MOB_MSHO-REQ message for requesting to execute a handover procedure to the base station [S110]. Having received the handover request, the serving base station informs candidate handover base station contained in the MOB_MSHO-REQ message of such a request [S115].

If possible, each of the candidate handover base stations takes preemptive steps for the mobile station having made the handover request and then delivers HO-RSP message to the serving base station of the mobile station [S120]. The serving base station delivers MOB_BSHO-RSP message to the mobile station [S125]. In this case, the MOB_BSHO-RSP message can contain such informations for performing the handover as an action time for performing the handover (Action Time), a handover-ID (HO-ID), a dedicated handover (HO) CDMA ranging code and the like.

If so, the mobile station determines one target base station (BS) based on the information contained in the MOB_BSHO-RSP message received through the cooperation with the serving base station. If the dedicated handover CDMA ranging code is provided, the mobile station sends RNG-REQ message for performing an initial ranging to the target base station [S130]. Having received the CDMA code, the target base station transmits information on success or failure of the ranging and physical correction values to the mobile station via RNG-RSP message [S135]. If the mobile station does not need to perform a correction, the mobile station sends RNG-REQ message for authentication to the target base station [S140]. Having received the RNG-REQ message, the target base station transmits such system information to be used by the target base station as CID (connection identifier) and the like [S145].

After successful completion of the authentication of the mobile station, if the target base station transmits all update information, whether the handover of the mobile station is successful can be announced via HO-CMPT message to a previous serving base station of the mobile station by the target base station [S150]. Thereafter, the mobile station is able to perform an information communication with the base station on which the handover is performed.

A legacy system is the system that observes a previous standard and corresponds to a system of the related art. For instance, IEEE 802.16e system corresponds to a legacy system as well. Yet, the legacy system is non-limited by IEEE 802.16e system only. A new system evolved from a previous system can be installed in a region where a legacy system is installed. In this case, the new system should be able to support all services for a new mobile station as well as a legacy mobile station.

On the previous IEEE 802.16e network, for handover of a mobile station, a base station is able to broadcast neighbor base station information in form of MOB_NBR_ADV message to mobile stations. In the MOB-NBR-ADV message sent to the mobile station by the base station, system information on a serving base station and neighbor base stations (e.g., preamble index, frequency information, handover optimization available extent, etc.) and DCD/UCD (downlink channel descriptor/uplink channel descriptor) information are contained. In this case, the DCD/UCD information contains informations the mobile station should be aware of for information exchange for downlink and uplink. The mobile station is able to obtain a system operation parameter via DCD/UCD message broadcasted by the base station in case of initialization. For instance, the mobile station receives the DCD/UCD message from the base station and is then able to obtain handover trigger information, MAC version of base station and MIH (media independent handover) capacity information on handover between heterogeneous networks.

Apart from the MOB_NBR_ADV message, if base stations of a heterogeneous network are present in the vicinity of the serving base station, the serving base station is able to broadcast a network service provider (NSP) list in form of SII-ADV (service identity information-advertisement) message to the mobile station in a prescribed cycle. If the mobile station makes SII-ADV message request, the serving base station is able to send SII-ADV message to the mobile station. In this case, the SII-ADV message contains an NSP list, a verbose NSP list, a query ID, an MIHF frame type, an MIHF frame and the like.

In case that a mobile station has to make a handover into a legacy base station that supports legacy mobile stations only, the mobile station should receive information on the legacy base station from a serving base station. However, if the serving base station transmits the information on the legacy base station nearby on a separate resource region for the legacy mobile station and a 16m mobile station, it causes a problem that a resource overhead for the redundant information increases.

DISCLOSURE OF THE INVENTION

Technical Problem

An object of the present invention is to provide a method of performing a handover.

The objects obtainable from the present invention are non-limited the above mentioned object. And, other unmentioned objects can be clearly understood from the following description by those having ordinary skill in the technical field to which the present invention pertains.

Technical Solution

To achieve these and other advantages and in accordance with the purpose of the present invention, a method of performing a handover, at a mobile station (MS) using a first communication scheme, to a second base station supporting a second communication scheme only in a wireless communication system, according to the present invention includes receiving a neighbor base station list broadcast message including time offset information indicating a transmission time of information on the second base station via a specific zone using the second communication scheme from the serving base station and receiving the information on the second base station via the specific zone based on the received time offset information, wherein the serving base station supports the first and second communication schemes.

Preferably, the neighbor base station list broadcast message further includes an indicator indicating whether at least one or more second base stations adjacent to the serving base station exist, further comprising transmitting a message for a scanning request to the serving base station when the indicator indicates that the at least one second base station exists, the method further includes transmitting a message for a scanning request to the serving base station.

To further achieve these and other advantages and in accordance with the purpose of the present invention, a method of performing a handover, at a mobile station (MS) using a first communication scheme, to a second base station (BS) supporting a second communication scheme in a wireless communication system, according to the present invention includes receiving a broadcast message including an indicator indicating whether at least one second base station adjacent to a serving base station exists from the serving base station, transmitting a message for a scanning request to the serving base station when the indicator indicates that the at least one or more second base stations exist, and receiving a scanning response message including an information on the second base station in response to the scanning request from the serving base station.

Preferably, the method further includes transmitting a message for a handover request to the serving base station in response to the received scanning response message.

Advantageous Effects

According to the present invention, a 16m mobile station is able to efficiently obtain information on legacy base station situated in the vicinity of the 16m mobile station based on time offset information and the like received from a serving base station via a specific zone.

According to the present invention, a base station need not transmit information on a legacy base station in the vicinity via MZone and LZone redundantly, thereby reducing a resource overhead considerably.

Effects obtainable from the present invention are non-limited the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE 802.16 system, they are applicable to other random mobile communication systems except unique features of the IEEE 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as an advanced mobile station (AMS), a user equipment (UE), a mobile station (MS) and the like. And, assume that a base station is a common name of such a random node of a network stage communicating with a terminal as a node B, an eNode B, a base station, an access point (AP) and the like.

In the present specification, a mobile station used in a legacy system only can be named a legacy mobile station (e.g., 16e mobile station, YMS, etc.), a base station supporting a legacy mobile station only can be named a legacy base station (e.g., 16e base station, legacy-only BS, YBS, etc.), and a base station capable of supporting IEEE 802.16m system mobile station only can be named a 16m base station (or 16m-only BS). A base station capable of legacy mobile stations as well as IEEE 802.16m mobile station can be named a legacy supportive 16m base station (or a legacy supportive ABS). A mobile station used in IEEE 802.16m network can be named a 16m mobile station or a mobile station. And, a mobile station used in IEEE 802.16e network, which is a legacy system, can be named a legacy mobile station, a 16e mobile station or the like.

In a mobile communication system, a mobile station (or AMS: advanced mobile station) is able to receive information in downlink (DL) from a base station. And, the mobile station is able to transmit information in uplink (UL) as well. Informations transmitted or received by the mobile station include data and various kinds of control informations. And, various kinds of physical channels exist in accordance with types and usages of the informations transmitted or received by the mobile station.

In the following description, a frame structure for supporting a legacy mobile station in IEEE 802.16m, which is one example of a mobile communication system, is schematically explained.

Figure 2:
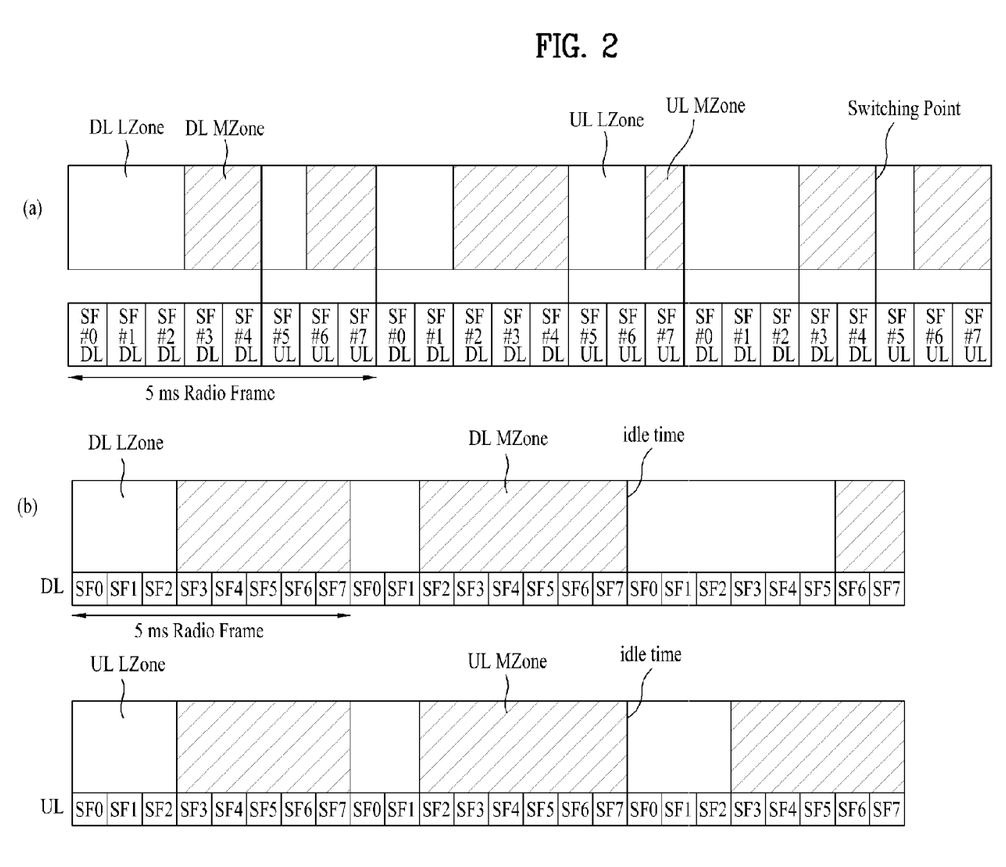
FIG. 2 is a diagram of one example of a frame structure for supporting a legacy mobile station in IEEE 802.16m.

FIG. 2 is a diagram of one example of a frame structure for supporting a legacy mobile station in IEEE 802.16m.

FIG. 2 (a) shows a frame structure in case of using TDD (time division duplex), and FIG. 2 (b) shows a frame structure in case of using FDD (frequency division duplex).

A time zone can be defined as the number of contiguous subframes, which is applicable to both TDD and FDD. MZone and LZone can be time-division-multiplexed in a region for DL. And, TDD and FDD can be supported for multiplexing of legacy and 16m mobile stations for UL transmission. UL/DL traffic for a mobile station can be scheduled in each zone (e.g., LZone or MZone) in accordance with a mode of the mobile station (e.g., legacy mobile station or 16m mobile station). In doing so, the mobile station is not connected to a base station in both of the MZone and the LZone.

Allocation of a time zone in TDD mode is shown in FIG. 2 (a). Duration of the zone is variable. And, each frame can start with a preamble and MAP. It is necessary for a switching point switched DL to UL or UL to DL to be synchronized along a network to reduce inter-cell interference. The switching point is usable as idle symbols. In a general frame structure of TDD mode, a last symbol of a slot is usable as a guard interval (or a guard time). As a result, transmission does not take place in this interval.

As mentioned in the foregoing description, in a frame structure of a 16m system, a 16m mobile station is able to transceive signals with a base station using MZone and a legacy mobile station is able to transceive signals with the base station using LZone.

In order to handover into a legacy base station or enter a network, a 16m mobile station needs to know such information as a type of a corresponding base station, a MAC version of a corresponding base station and the like. A mobile station can be aware of such information if a serving base station regularly broadcasts the corresponding information to mobile stations in a prescribed cycle. Alternatively, a mobile station can be aware of such information transmitted by a serving base station according to a request made by the corresponding mobile station.

Figure 3:
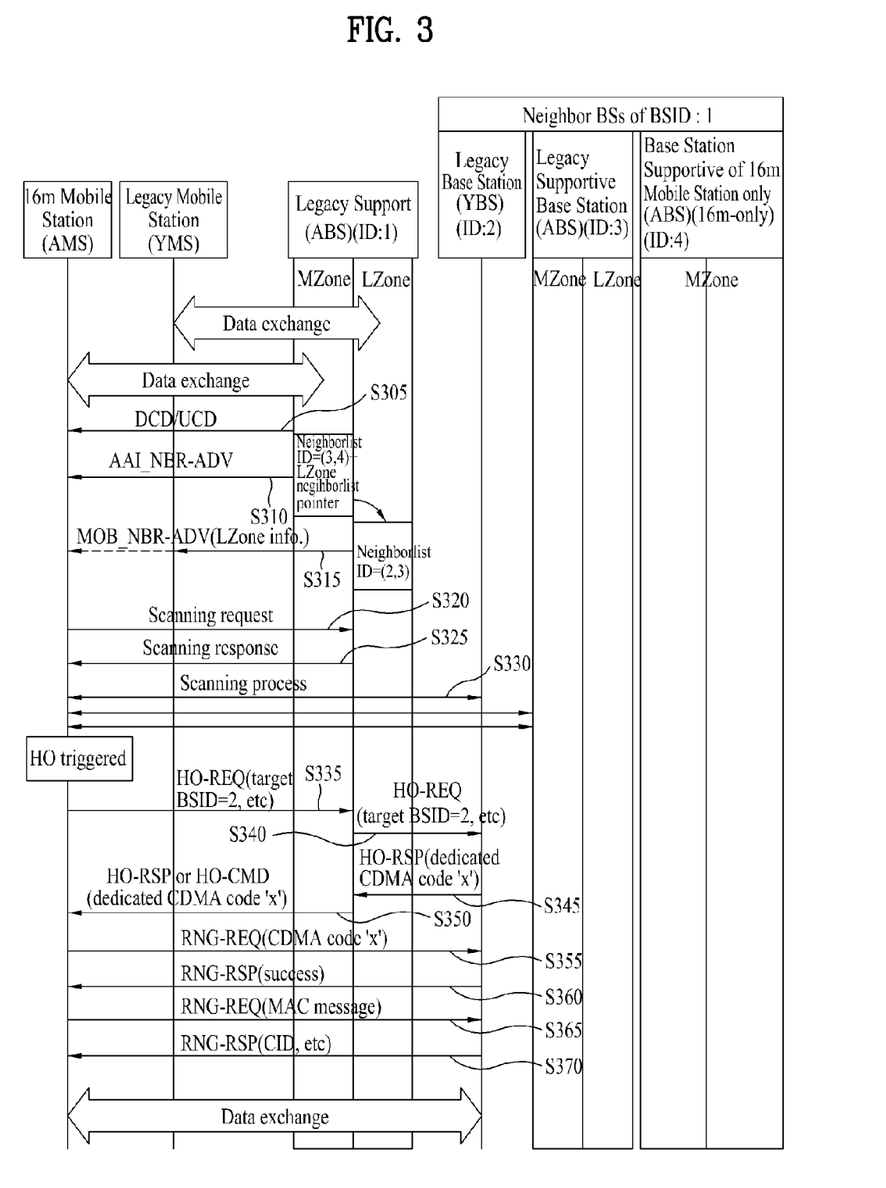
FIG. 3 is a diagram for one example of a process for a 16m mobile station to make a handover into a legacy base station from a base station (i.e., a serving base station) capable of supporting legacy mobile stations as well.

FIG. 3 is a diagram for one example of a process for a 16m mobile station to make a handover into a legacy base station from a base station (i.e., a serving base station) capable of supporting legacy mobile stations as well.

Referring to FIG. 3, a 16m mobile station is able to transceive data with a legacy supportive base station using MZone of a base station capable of supporting a legacy mobile station that is a serving base station. And, the legacy mobile station is able to transceive data with the legacy supportive base station using LZone of the serving base station. First of all, the 16m mobile station is able to obtain a system operating parameter by receiving DCD/UCD message from a base station capable of supporting the legacy mobile station that is the serving base station [S305]. Subsequently, the 16m mobile station is able to receive a neighbor base station list information containing information on a neighbor base station, time offset information and the like from the legacy supportive base station, which is the serving base station, through MZone via AAI_NBR-ADV message [S310].

One example of a format of AAI_NBR-ADV message received by a 16m mobile station from a serving base station is shown in Table 1.

TABLE 1

| Name | Value | Usage |
|---|---|---|
| AAI_NBR-ADV_Message_format( ) { | — | — |
| Management Message Type = NN | 8 | — |
| Change Count | 3 | NBR-ADV change count |
| Number of cell types | 3 | — |
| Cell type in this message | 3 | |
| Total Number of Segments | TBD | Number of segments for this cell type |
| Segment Index | TBD | Segment index of this message in the specific cell type |
| BS number M | TBD | Total number of BSs to be included in this segment |
| Starting Index of BS | 8 | This indicates the index offset from the last BS of the previous fragment. If this is the first fragment, the Starting Index will be 0. Hence, each fragment has one Index which corresponds to the first BS in that fragment. |
| Greenfield indicator | 1 | Indicates whether one or more WirelessMAN-OFDMA Reference systems are present in the vicinity of the serving ABS |
| For (i=0; i<M; i++) { | — | — |
| BSID | 48 | — |
| Center Frequency | TBD | The frequency raster of the center frequency of the left most carrier (i.e. lowest frequency located). |

TABLE 1-continued

| Name | Value | Usage |
|---|---|---|
| Multicarrier configuration mode (MCM) | 2 | 0b00: Single carrier mode<br>0b01: One Carrier group<br>0b10: Multiple Carrier groups<br>0b11: Reserved<br>*Note: If 0b00. NCG and NC is implicitly set to 1. If 0b01. NCG is implicitly set to 1. |
| If (MCM ==0b10) {<br>  Number of Carrier Groups (NCG)<br>} | 6 | Number of carrier groups of the ABS |
| If (MCM ==01 \|\| MCM ==10) {<br>  Number of carriers (NC)<br>} | 6 | Number of carriers of the ABS |
| For (j=0; j<NCG; j++) {<br>  For (j=0; j<NC; j++) { | — | — |
|     SA-PREAMBLE index | TBD | — |
|     Carrier Bandwidth | 5 | Bandwidth size of the carrier<br>0b00000: 5 MHz<br>0b00001: 10 MHz<br>0b00010: 20 MHz<br>0b00011: 7 MHz<br>0b00100: 8.75 MHz<br>0b00101~0b00111: Reserved |
|     SA-Preamble power de-boosting level | 6 | Values indicate power back-off levels in 0.1 dB steps starting from 0 Db |
|     Duplexing Mode | 1 | "0" for TDD<br>"1" for FDD |
|     MAC protocol version | 8 | MAC protocol version of the BS Consistent with REV.2 definition, with new MAC protocol version 9 defined for 16 m. |
|     SFH_encoding_format | 2 | 0b00: full Subpkt information<br>0b01: delta encoding with TBD format (the 1st BS in this cell type shall use full Subpkt encoding)<br>0b10: no SFH included<br>0b11: reserved<br>For macrocell ABS, the bitmap shall be either 0b00 or 0b01 |
|     Control_bitmap | 4 | Each bit maps to one SFH subpacket or extended broadcast information. For macrocell ABS, the bitmap shall be 1111 |
|     If( SFH_encoding_format =00) { | — | //encoding format type-1 |
|       If( Control_bitmap[0] ==1 ){ | — | — |
|         SFH Subpkt 1 | TBD | //exclude those fields already in cell type info |
|       } | — | — |
|       If( Control_bitmap[1] ==1 ){ | — | — |
|         SFH Subpkt 2 | TBD | //exclude those fields already in cell type info |
|       } | — | — |
|       If( Control_bitmap[2] == 1 ){ | — | — |
|         SFH Subpkt 3 | TBD | //exclude those fields already in cell type info |
|       } | — | — |
|     } | — | — |
|     If( SFH_encoding_format =01) { | — | — |
|       Delta information | — | Delta encoding, w.r.t. the reference BS |
|     } | — | — |
|   } | — | — |
| } | — | — |
| } | — | — |
| } | — | — |

Referring to Table 1, a 16m mobile station is able to know whether at least one or more legacy base stations exist in the vicinity of a serving base station through a greenfield indicator within AAI_NBR-ADV message format. In particular, the serving base station is able to inform the 16m mobile station whether a legacy base station exists in the vicinity using the greenfield indicator within the AAI_NBR-ADV message format.

In the step S310, the neighbor base station list information received by the 16m mobile station from the serving base station can contain a neighbor base station list capable of supporting a legacy mobile station located in the vicinity of the serving base station as well and a neighbor base station capable of supporting a 16m system mobile station only. In this case, time offset information indicates a time taken from a point at which the 16m mobile station receives the neighbor base station list to a point of receiving information containing a list of base stations capable of supporting a legacy mobile station and base stations supporting a legacy mobile station only via LZone of a legacy supportive base station that is a serving base station. In particular, the time offset means a time taken from a point for the 16m mobile station to receive the neighbor list information via MZone of the serving base station to a point of receiving the neighbor list information via the LZone of the serving base station again.

The 16m mobile station obtains synchronization of the LZone of the serving base station based on the above time offset information and is able to receive the legacy base station information and the information on the base station capable of supporting the legacy mobile station as well via the LZone. And, the time offset information can be contained in the format of the AAI_NBR-ADV message.

Thus, the 16m mobile station can be aware of a time of transmitting the LZone information (possibly containing a time and a resource region position for transmitting MOB_NBR-ADV message) based on the time offset information received from the serving base station via the MZone. Therefore, the 16m mobile station temporarily switches to the LZone by being synchronized with the LZone and is then able to receive a message for the neighbor base station as does the legacy mobile station. In this case, since the MOB_NBR-ADV message of the LZone is a broadcast information, it is not necessary to give such a setup value as CID that will operate in the LZone.

Yet, the legacy mobile station is able to receive the MOB_NBR-ADV message from a base station capable of supporting the legacy mobile station, which is the serving base station, via the LZone [S315]. In this case, in the MOB_NBR-ADV message, a list of base stations supportive of legacy mobile stations in the vicinity of the serving base station only and a list of base stations supportive of legacy mobile stations as well can be contained.

Since the Greenfield indicator within the AAI_NBR-ADV message format received by the 16m mobile station in step [S310] is set to 1, it is determined that at least one legacy base station exists in the vicinity of the 16m mobile station. Having received such information on neighbor base stations completely, the 16m mobile station is able to send a message for requesting a scanning to the serving base station via the MZone [S320]. Thereafter, the 16m mobile station receives a scanning response message from the serving base station [S325]. The 16m mobile station requests the scanning and then performs a scanning process [S330]. Subsequently, the 16m mobile station is able to send a message for requesting a handover to a specific neighbor base station (e.g., a legacy base station supportive of legacy mobile stations only) to the serving base station via the MZone [S335].

If so, as mentioned in the foregoing description of the embodiment shown in FIG. 2, the serving base station is able to forward the message, which is sent to the serving base station by the 16m mobile station to request the handover into the legacy base station (BSID=2), to the legacy base station supportive of legacy mobile stations only [S340]. If so, the 16m mobile station initiates a 16e handover procedure with the legacy base station.

If the serving base station sends the handover request message to the legacy base station (BSID=2) [S340], the legacy base station (BSID=2) sends a handover response message containing a dedicated CDMA code to the serving base station [S345]. Subsequently, the serving base station sends a handover response message or a handover command message, in which the dedicated CDMA code received from the legacy base station (BSID=2) is contained, to the 16m mobile station [S350].

Thereafter, the 16m mobile station performs a ranging process with the legacy base station using the received CDMA code [S355 to S370]. After such a handover procedure has been successfully completed, normal data transmission and reception can be performed between the 16m mobile station and the legacy base station.

As mentioned in the foregoing description of the embodiment shown in FIG. 3, a 16m mobile station is able to efficiently obtain information on legacy base stations situated in the vicinity of the 16m mobile station based on time offset information received from a serving base station via MZone and the like. Since information on legacy base stations in the vicinity need not be transmitted via MZone and LZone redundantly, resource overhead can be considerably reduced.

According to another embodiment, a following situation may occur. First of all, a 16m mobile station should make a handover into a legacy base station supportive of legacy mobile stations only among neighbor base stations in the vicinity of the 16m mobile station in the course of being served by a 16m base station capable of supporting 16m mobile stations only.

Figure 4:
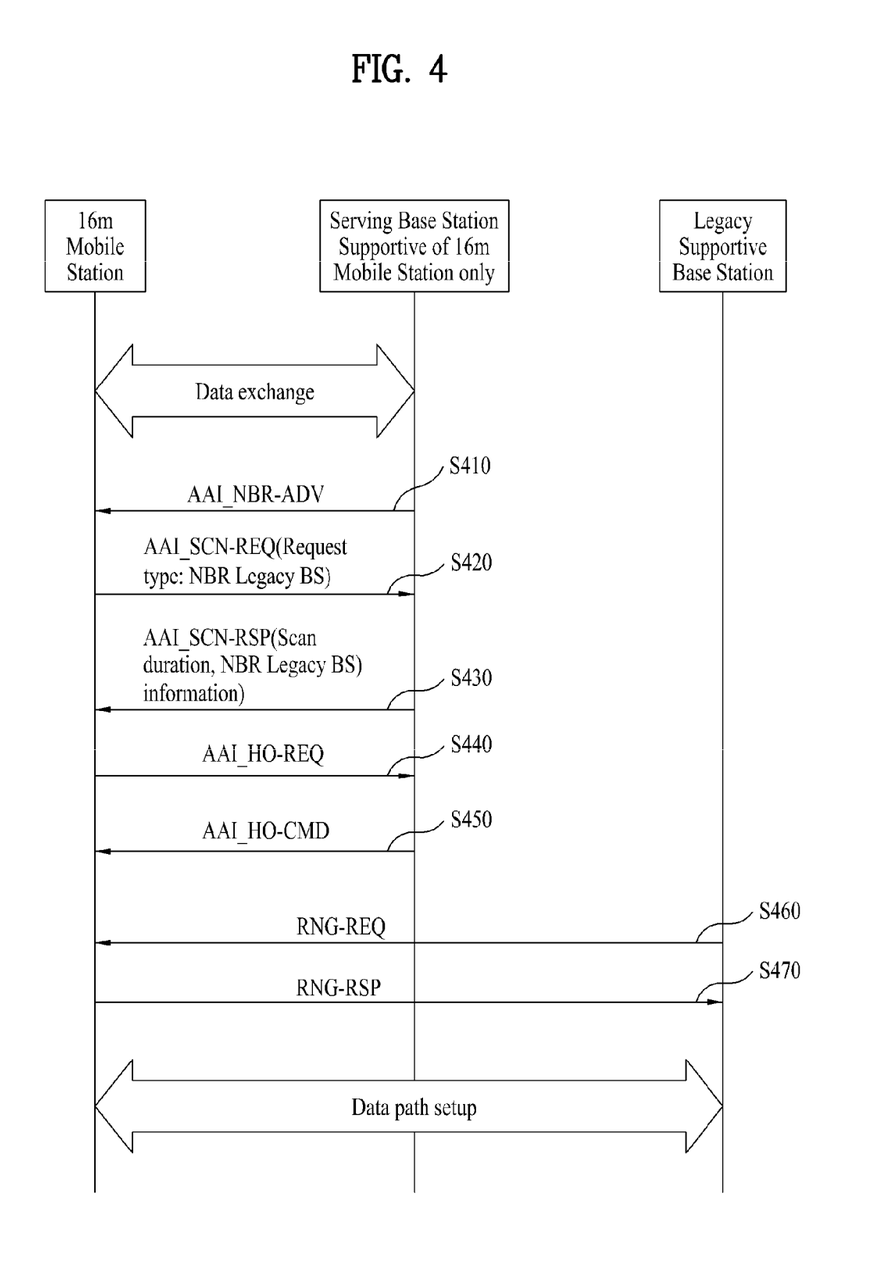
FIG. 4 is a diagram for one example of a process for a 16m mobile station to make a handover into a legacy base station from a base station (i.e., a serving base station) capable of supporting 16 mobile stations only.

FIG. 4 is a diagram for one example of a process for a 16m mobile station to make a handover into a legacy base station from a base station (i.e., a serving base station) capable of supporting 16 mobile stations only.

In order to make a handover into a legacy base station, a 16m mobile station needs to know information on a neighbor legacy base station into which the 16m mobile station can make a handover from a base station (i.e., a serving base station) capable of supporting 16m mobile stations only. For this, the base station, which is the serving base station) capable of supporting 16m mobile stations only sends information on neighbor base stations to the 16m mobile station using AAI_NBR-ADV message [S410]. In this case, a format of the AAI_NBR-ADV message sent to the serving base station can use the format shown in Table 1.

As a greenfield indicator within the format of the AAI_NBR-ADV message received by the 16m mobile station in the step S410 is set to 1, if the 16m mobile station determines that at least one legacy base station exists in the vicinity, the 16m mobile station is able to make a request for information on neighbor legacy base stations to the serving base station via a scanning request message (AAI_SCN-REQ) [S420].

Table 2 shows one example of a format of AAI_SCN-REQ message sent to a serving base station by a 16m mobile station.

TABLE 2

| Name | Value | Usage |
| --- | --- | --- |
| Scan duration | Duration (in units of AAI subframes) of the requested scanning period. | |
| Scan Purpose | 0b00: scan BS(s) which is in the list of the AAI_NBR-ADV message<br>0b01: scan BS(s) which is not in the list of the AAI_NBR-ADV message<br>0b10: scan Legacy BS(s) which is not in the list of the AAI_NBR-ADV message<br>0b11: Reserved | |
| ... | ... | ... |

Referring to Table 2, in case that a serving base station is a base station supportive of 16m mobile stations only, a 16m mobile station is able to request information on neighbor legacy base station(s) by setting a scan purpose to 0b10.

Yet, a 16m base station supportive of 16m mobile stations only is unable to broadcast information on neighbor legacy base station(s) using LZone. In this case, in response to the scanning request message (AAI_SCN-REQ), the serving base station is able to send a scanning response message (AAI_SCN-RSP) containing a scan duration and information on the neighbor legacy base station(s) to the 16m mobile station [S430].

Table 3 is a diagram for one example of a format of AAI_S-CNM-RSP message sent to a 16m mobile station by a serving base station.

base station supportive of both 16m and legacy system communication schemes via a specific zone using a legacy communication scheme, from the serving base station. And, the

TABLE 3

| Name | Value | Usage |
| --- | --- | --- |
| Scan duration | Duration (in units of AAI subframes) of the requested scanning period. | |
| Scan Purpose | 0b00: scan BS(s) which is in the list of the AAI_NBR-ADV message<br>0b01: scan BS(s) which is not in the list of the AAI_NBR-ADV message<br>0b10: scan Legacy BS(s) which is not in the list of the AAI_NBR-ADV message<br>0b11: Reserved | |
| N_Recommended_Legacy_BS_Full_indication | Indicates whether N_Recommended_Legacy_BS_Full field is included in this message. This is valid only if Scan duration is not equal to zero. | |
| N_Recommended_Legacy_BS_Full | Number of neighboring BS to be scanned, which are using full 48-bit BS ID. | Included when Scan Duration >0 |
| Recommended Legacy BSID | Based on the value of N_Recommended_BS_Full, Recommended BS ID list for scan is included | Included when N_Recommended_Legacy_BS_Full >0 |
| Preamble Index of Recommended BS ID | Preamble Index of Recommended Legacy BS ID | Included when N_Recommended_Legacy_BS_Full >0 |
| Legacy FA index | Frequency index of the Legacy BS | Included when N_Recommended_Legacy_BS_Full >0 |
| BW | Bandwidth size of the Legacy BS | Included when N_Recommended_Legacy_BS_Full >0 |
| ... | ... | ... |

Referring to Table 3, AAI_SCN-RSP message is able to include the number of neighbor base stations to be scanned using total 48 bits, recommended base station ID information for a scan, preamble index information of recommended legacy base station ID, frequency index of legacy base station, bandwidth size information and the like.

The 16m mobile station sends a message (AAI_HO-REQ) for requesting a handover to the serving base station based on the AAI_SCN-RSP message shown in Table 3 [S440]. The serving base station receives the handover request message and then sends a message (AAI_HO-CMD) for commanding the handover to the 16 m mobile station [S450]. If so, the 16m mobile station sends a message (RNG-REQ) for requesting a ranging to the legacy base station (i.e., the target base station) supportive of legacy mobile stations only [S460]. In response to the ranging request message (RNG-REQ), the legacy base station sends a ranging response (RNG-RSP) to the 16m mobile station [S470].

After completion of the above-described steps, a data path is established between the 16m mobile station and the legacy base station to enable normal data transmission and reception.

Figure 5:
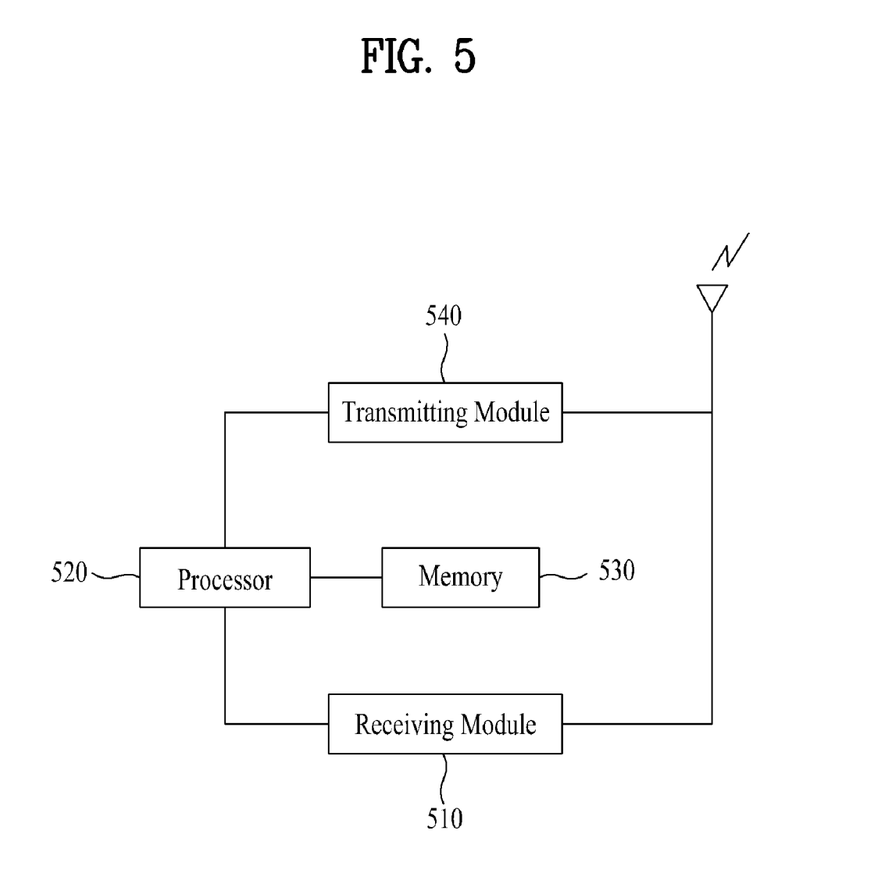
FIG. 5 is a diagram for configuration of a mobile station device according to one preferred embodiment of the present invention.

FIG. 5 is a diagram for configuration of a mobile station device according to one preferred embodiment of the present invention.

Referring to FIG. 5, a mobile station device according to the present invention can include a receiving module 540, a processor 520, a memory 530 and a transmitting module 540.

The receiving module 510 is able to receive various signals, data and the like from a serving base station. The receiving module 510 is able to receive a neighbor base station list broadcast message, which contains time offset information indicating a timing point of transmitting information on a legacy base station (supportive of mobile stations using a legacy system communication scheme only) from the serving base station supportive of both 16m and legacy system communication schemes via a specific zone using a legacy communication scheme, from the serving base station. And, the receiving module 510 is able to receive the information on the legacy base station from the serving base station via the specific zone based on the received time offset information. In this case, the neighbor base station list broadcast message is able to further include an indicator indicating whether at least one legacy base station neighbor to the serving base station exists.

After completion of the above process, the receiving module 510 is able to receive various kinds of informations, messages and the like required for the handover from the serving base station and the like.

If the indicator received by the receiving module 510 indicates that at least one second base station exists, the transmitting module 540 is able to send a message for a scanning request to the serving base station.

The processor 520 is able to process information received by the receiving module 510 and the like. The processor 520 is able to determine a specific base station as a base station to make a handover into based on the received information on the legacy information. If so, the transmitting module 540 is able to send a message for requesting the handover into the determined base station to the serving base station. Thus, the transmitting module 540 is able to transmit request information required for the handover, messages and the like to the serving base station.

The memory 530 is able to store the information processed by the processor 510 and the like for a prescribed period of time and can be replaced by a buffer (not shown in the drawing) and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

INDUSTRIAL APPLICABILITY

Accordingly, a handover performing method according various embodiments of the present invention is industriously applicable to various wireless communication systems.

What is claimed is:

1. A method of a mobile station (MS) performing handover from a serving-base station (S-BS) that supports a first communication scheme to a target-base station (T-BS) that supports a second communication scheme, the method comprising:
   receiving an advanced air interface-neighbor-advertisement (AAI-NBR-ADV) message via an MZone of the S-BS, the MZone used for the first communication scheme and the AAI-NBR-ADV message including information related to at least one neighboring BS having an MZone and further including information related to transmission timing of a mobile-neighbor-advertisement (MOB-NBR-ADV) message to be received via an LZone of the S-BS if the S-BS supports both the first and the second communication schemes, the LZone used for the second communication scheme;
   receiving the MOB-NBR-ADV message via the LZone of the S-BS based on the information related to the transmission timing, the MOB-NBR-ADV message including system information related to at least one neighboring BS having an LZone that is used for the second communication scheme;
   scanning the at least one neighboring BS; and
   performing the handover to an LZone of a T-BS among the at least one neighboring BS based on a result of the scanning.

2. The method of claim 1, wherein the information related to the transmission timing includes an offset from predetermined timing for receiving the MOB-NBR-ADV message.

3. The method of claim 1, wherein the information related to the transmission timing includes an interval for receiving the MOB-NBR-ADV message.

4. The method of claim 1, wherein the system information includes system information related to a neighboring BS having only the LZone and system information related to a neighboring base station having both the LZone and the MZone.

5. The method of claim 1, wherein the AAI-NBR-ADV message further includes information related to a starting BS index that indicates an offset from a last BS of a previous AAI-NBR-ADV message segment.

6. The method of claim 5, wherein the starting BS index is set to 0 for a first AAI-NBR-ADV message segment.

7. The method of claim 1, wherein performing the handover comprises:
   transmitting a handover request message to the S-BS to initiate the handover; and
   receiving a handover command message from the S-BS that commands the MS to handover to the T-BS.

8. The method of claim 1, wherein the AAI-NBR-ADV message further includes system information related to at least one neighboring BS having an MZone that is used for the first communication scheme.

9. A mobile station (MS) in an MZone of a serving-base station (S-BS) that supports a first communication scheme, the MS comprising:
   a receiver configured to receive data from the S-BS; and
   a processor configured to perform handover from the S-BS to a target-base station (T-BS) that supports a second communication scheme by:
   controlling the receiver to receive an advanced air interface-neighbor-advertisement (AAI-NBR-ADV) message via the MZone, the MZone used for the first communication scheme and the AAI-NBR-ADV message including information related to at least one neighboring BS having an MZone and further including information related to transmission timing of a mobile-neighbor-advertisement (MOB-NBR-ADV) message to be received via an LZone of the S-BS if the S-BS supports both the first and the second communication schemes, the LZone used for the second communication scheme;
   controlling the receiver to receive the MOB-NBR-ADV message via the LZone of the S-BS based on the information related to the transmission timing, the MOB-NBR-ADV message including system information related to at least one neighboring BS having an LZone that is used for the second communication scheme,
   scanning the at least one neighboring BS; and
   performing the handover to an LZone of a T-BS among the at least one neighboring BS based on a result of the scanning.

10. A method of a serving-base station (S-BS) that supports handover of a mobile station (MS) to a target-base station (T-BS), the method comprising:
   transmitting an advanced air interface-neighbor-advertisement (AAI-NBR-ADV) message via an MZone of the S-BS, the MZone used for a first communication scheme and the AAI-NBR-ADV message including information related to at least one neighboring BS having an MZone and further including information related to transmission timing of a mobile-neighbor-advertisement (MOB-NBR-ADV) message to be transmitted via an LZone of the S-BS if the S-BS supports both the first and the second communication schemes, the LZone used for a second communication scheme;
   transmitting the MOB-NBR-ADV message via the LZone of the S-BS based on the information related to the transmission timing, the MOB-NRB-ADV message including system information related to at least one neighboring BS having an LZone that is used for the second communication scheme; and
   performing the handover to an LZone of a T-BS among the at least one neighboring BS that has the LZone.

11. The method of claim 10, wherein the AAI-NBR-ADV message further includes information related to a starting BS index that indicates an offset from a last BS of a previous AAI-NBR-ADV message segment.

12. The method of claim 11, wherein the starting BS index is set to 0 for a first AAI-NBR-ADV message segment.

13. The method of claim 10, wherein the information related to the transmission timing includes an offset from predetermined timing for transmitting the MOB-NBR-ADV message.

14. The method of claim 10, wherein the information related to the transmission timing includes an interval for transmitting the MOB-NBR-ADV message LZone.

15. The method of claim 10, wherein the system information on includes system information related to a neighboring BS having only the LZone and system information related to a neighboring base station having both the LZone and the MZone.

16. The method of claim 10, wherein the performing the handover comprises:
   receiving a handover request message from the MS to initiate the handover; and
   transmitting a handover command message to the MS that commands the MS to handover to the T-BS.

\* \* \* \* \*